Patented Nov. 23, 1948

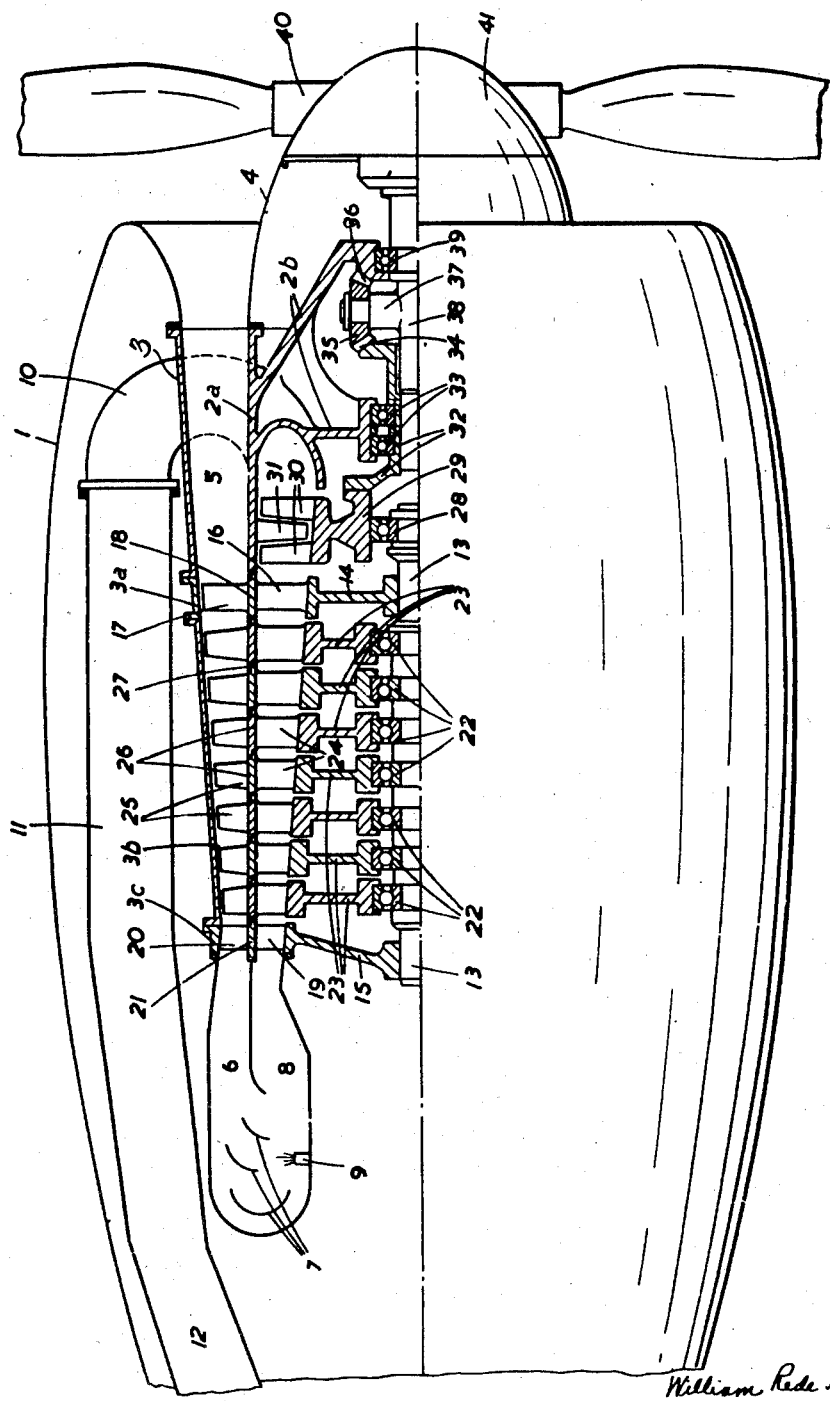

2,454,738

UNITED STATES PATENT OFFICE 2,454,738

INTERNAL-COMBUSTION TURBINE POWER PLANT

William Rede Hawthorne, Silver Spring, Md., assignor to Power Jets (Research and Developments) Ltd., London, England, a British company Application January 31, 1945, Serial No. 575,540
In Great Britain January 31, 1944

9 Claims. (Cl. 170—135.6)

This invention relates to internal combustion turbine power plants for installation as prime movers for aircraft, and in which air is compressed in a compressor, delivered into combustion chamber means, into which fuel is injected and burnt continuously at constant pressure and then expanded to a lower pressure in a turbine which drives the compressor.

An object of the invention is the provision of a power plant of the kind referred to, which is especially adapted for driving an airscrew propeller.

Further objects of the invention include provision of a power plant of the kind first herein referred to, of especially compact construction, well adapted for installation in an aircraft nacelle or fuselage, and wherein excessive axial length of the power plant with its accompanying disadvantages is avoided by coaxially nesting the compressor and primary turbine elements, both of which are of the axial flow type.

Further objects include the provision of jet reaction propulsion means in addition to the airscrew propeller and a form of construction of the compressor and primary turbine elements, whereby the transmission to the fixed structure of torque reactions other than that inseparable from the driving of the airscrew is avoided.

How the foregoing objects and others as will hereinafter appear are attained and in what manner the invention may be performed will be understood from the following description, given by way of example and having reference to the accompanying drawings of an embodiment of the invention, the scope of which is defined in the appended claims.

The accompanying drawing shows in half axial section (partly diagrammatic), an internal combustion turbine unit intended for installation in an aircraft as a screw propeller-assisted jet propulsion motor.

Referring to the drawing, 1 indicates the outer skin of the nacelle enclosing the power plant whose fixed structure comprises a forward casing member 2a, 2b, an external casing built up from rings 3, 3a, 3b, 3c, an intermediate diaphragm 14, a rear diaphragm 15 and a fixed axle 13, secured to the diaphragms 14, 15. The casing member 2a, 2b comprises a substantially cylindrical shell 2a and two diaphragms 2b connected by stiffening webs, all integrally formed; the cylindrical shell 2a, and the casing ring 3 define an annular entry duct 5 to the compressor component, the intake to this duct being constituted by the inwardly folded leading portion of the nacelle skin 1, which is attached to and continuous with the casing ring 3 and a forward fairing 4 attached to and continuous with the shell portion 2a of the forward casing member.

The casing rings 3a, 3b, 3c enclose an annular duct within which the compressor elements operate as hereafter described. This compressor duct delivers into a duct 6, which by way of an 180° elbow furnished with internal guide vanes 7 for suppressing turbulence, leads into a combustion chamber 8, containing a fuel injection nozzle 9. The discharge from the combustion chamber passes to a second annular duct within which the turbine elements operate as hereafter described. This turbine duct is concentric with and situated within the compressor duct, the flow through the turbine being in the opposite direction to that in the compressor as will hereinafter be more fully described.

The intermediate diaphragm 14 is connected by integral webs 16 with a shroud ring 18, continuous with the cylindrical shell 2a, and another set of radial webs 17 connects the shroud ring 18 with the casing ring 3a; similarly, the diaphragm 15 is connected by radial webs 19 with a shroud ring 21 which is in turn connected by further radial webs 20 with the casing ring 3c.

Between the diaphragms 14 and 15 are arranged a number of rotor wheels 23, rotatably supported on the axle 13 by means of bearings 22. Each rotor wheel has a row of double tier blading 24, 25, the inward blading portions 24 being separated from the outer blade portions 25 by shroud elements 26, which when the blading is assembled on the wheels constitute continuous shroud rings. The inward blade portions 24 are formed as turbine blading and the outer blades 25 as compressor blading, the blade angles being so selected that alternate rotor wheels 23 counter-rotate. There is thus no requirement for stator blading either in the compressor or the turbine, but the webs 16, 17, 19, 20 act as guide vanes at the entry and exit of the turbine and compressor components. The clearances between and at the ends of shroud rings 26 are sealed by gland means not shown in detail.

The annular compressor duct is thus defined by the casing rings 3a, 3b, 3c, the fixed shroud rings 18, 21 and the rotating shroud rings 26 and the flow therethrough is from right to left in the drawing, i. e. from duct 5 to duct 6, the flow at entry and exit being straightened by the guide vane webs 17 and 20 respectively. Similarly, the annular turbine duct is defined by the fixed and rotating shroud rings 21, 18 and 26 respectively and the rims of the fixed diaphragms 14, 15 and rotating wheels 23 respectively, the flow being from left to right in the drawing; the guide vane webs 19, 16 serve to straighten the flow at entry and exit of the turbine respectively.

At the exhaust end of the primary turbine 23, 24 is arranged an independent exhaust turbine for driving an airscrew propeller as hereafter described and consisting of a turbine wheel 29, rotatably supported on the axle 13 by a bearing 28 and carrying two stages of rotor blading 30, separated by a row of stator blades 31 mounted on the inward face of the cylindrical casing shell 2a. The exhaust from this auxiliary turbine is carried away by ducts 10, having an 180° bend, into an annular duct 11, whose discharge end 12 delivers to a propulsive jet nozzle (not illustrated).

It will, therefore, be seen that the flow of working fluid through the complete compressor turbine unit is subject to two complete reversals of direction, namely at 7 and 10 respectively.

The auxiliary exhaust turbine rotor 29 is connected by means of a flange coupling to a shaft 32, which is supported in bearings 33 housed in an extension of the rear diaphragm 2b of the casing member 2a, 2b.

The shaft 32 carries a bevel pinion 34 in mesh with planet pinions 35, carried by a spider 37 integral with a propeller shaft 38, on which is mounted a tractor screw propeller 40, carrying a spinner 41. The propeller reduction gear is completed by a stationary bevel annulus gear 36, meshing with the planet pinions 35, and formed on an extension of the forward diaphragm 2b of the casing member 2a, 2b, which also houses a bearing 39 supporting the propeller shaft 38.

The direction of flight of the aircraft being from left to right in the drawing, it will be seen that the forward facing air intake defined by the elements 1, 4, is situated immediately behind the disc of the propeller 40, so that the intake is subjected to the full ramming effect of the forward speed of the aircraft plus the slipstream of the tractor propeller.

The arrangement of the primary turbine and compressor component concentrically on the contra flow principle, together with the use of two-tier turbine compressor blading not only enables the whole unit to be very compactly constructed with the elimination of interconnecting shafting, but also provides a certain amount of regenerative heating of the charge before combustion, and cools the turbine blading so as to keep the blade temperatures, especially at the high pressure end of the turbine, within reasonable limits without serious sacrifice of efficiency.

Since the exhaust turbine driving the propeller is independent of the primary turbine, its speed can be appropriately selected to permit the use of single stage propeller reduction gearing, as illustrated, thus avoiding the use of double or multiple-stage reduction gearing, which would normally be required if the propeller were driven by the primary turbine whose speed is dictated by the requirements of the compressor.

A further advantage results from the use of contra-rotating combined turbo-compressor elements not subjected to any external load, in that all torque reactions within the turbo-compressor components are automatically self-balancing (torque reaction will, of course, be experienced from the propeller with auxiliary turbine component, being the algebraic sum of the torque reactions of the annulus gear 36 and the stator blading 31; the net torque reaction being taken by the casing member 2a, 2b, which transmits it to the aircraft structure through its mounting).

Other convenient forms of auxiliary turbine may be used for driving the propeller as alternatives to the single rotor type illustrated. For example, a pair of contra rotating turbine wheels may be used, which drive the propeller through concentric shafts and suitable reduction gearing or the concentric shafts may drive through appropriate gearing a pair of contra-rotating propellers. Again, more than two auxiliary turbine stages may be incorporated. The distribution of available power in the exhaust gases discharged from the primary turbine between the propulsive jet and the propeller may be decided according to the design requirements of particular installations, ranging between those in which the major part of the available power is absorbed by the propeller to those in which the major part is absorbed by the propulsive jet and the propeller is a relatively minor contributor to the total propulsive effort.

What I claim as my invention and desire to secure by Letters Patent is:

1. An internal combustion turbine power plant for aircraft operating on the constant pressure cycle with continuous flow comprising an axial flow compressor, an axial flow primary turbine coaxially nested within and driving the compressor, duct means and combustion chamber means providing communication from the outlet of the compressor to the inlet of the primary turbine the direction of flow being reversed through 180° in said duct and combustion chamber means, means including compressor and turbine blading providing compressor and turbine flow channels through which the flow occurs in opposite axial directions, an independent axial flow turbine in close coaxial tandem relationship with the primary turbine and operated by the exhaust therefrom, and an airscrew propeller coaxial with said compressor and turbines and driven by said independent turbine.

2. An internal combustion turbine power plant as claimed in claim 1, further comprising structure forming a compressor air intake opening facing in the direction of motion of the aircraft and placed immediately behind the airscrew propeller.

3. An internal combustion turbine power plant as claimed in claim 1, further comprising exhaust duct means receiving the exhaust from the independent (airscrew driving) turbine and delivering said exhaust to jet reaction nozzle means at the rear of the power plant, said duct means having a 180° bend providing a second reversal of flow.

4. An internal combustion turbine power plant as claimed in claim 1, further comprising coaxial reduction gear means transmitting drive from the independent turbine to the airscrew.

5. An internal combustion turbine power plant as claimed in claim 1, further comprising rotor elements common to the compressor and primary turbine and having rows of two-tier blades of which the outer parts constitute compressor blades and the inner parts turbine blades.

6. An internal combustion turbine power plant as claimed in claim 1, further comprising rotor elements common to the compressor and primary turbine and having rows of two-tier blades of which the outer parts constitute compressor blades and the inner parts turbine blades, and shrouding elements intermediate the turbine and compressor blade parts of said blades and constituting complete shroud rings separating the turbine and compressor flow channels when the blades are assembled in the rotor elements.

7. An internal combustion turbine power plant as claimed in claim 1, further comprising a plurality of independently rotatable coaxial rotor elements arranged in tandem, a row of two-tier blades carried by each of said rotor elements of which two-tier blades the outer and inner parts constitute the blading of the compressor and the primary turbine, respectively, the blading of adjacent rotor elements being of opposite hand causing adjacent rotor elements to counter-rotate.

8. An internal combustion turbine power plant as claimed in claim 1, further comprising a plurality of independently rotatable coaxial rotor elements arranged in tandem, a row of two-tier blades carried by each of said rotor elements of which two-tier blades the outer and inner parts constitute the blading of the compressor and the primary turbine, respectively, the blading of adjacent rotor elements being of opposite hand causing adjacent rotor elements to counter-rotate, and shrouding elements intermediate the turbine and compressor blade parts of said two-tier blades which when the whole is assembled constitute a number of closely fitting complete shroud rings defining a substantially continuous boundary between the flow channels of the turbine and the compressor.

9. An internal combustion turbine power plant for aircraft comprising a propeller, structure behind the propeller forming an annular air entry, a multi-stage axial compressor supplied by said entry and comprising a plurality of rows of compressor blading of alternately opposite hand, a like plurality of coaxially mounted independently rotatable rotor elements each supporting a row of said blading, a multi-stage axial turbine comprising a like plurality of rows of turbine blading of alternately opposite hand provided radially between said rotor elements and said compressor blading and supporting the latter, said compressor and turbine blading constituting two-tier blading, duct means and combustion chamber means arranged to receive air from the end of said compressor remote from said propeller, burn fuel therein and direct the combustion products into the corresponding end of said turbine, an independent axial turbine coaxial with said rotor elements and mounted axially between said rotor elements and said propeller, reduction gearing operatively arranged between and drivably connecting said independent turbine and said propeller, and exhaust duct means to receive the exhaust gases from said independent turbine and deliver them to a region remote from said air entry.

WILLIAM REDE HAWTHORNE.

REFERENCES CITED

The following references are of record in the file of this patent:

UNITED STATES PATENTS

| Number | Name | Date |
|---|---|---|
| 2,050,349 | Lysholm et al. | Aug. 11, 1936 |
| 2,160,281 | Price | May 30, 1939 |
| 2,168,726 | Whittle | Aug. 8, 1939 |
| 2,243,467 | Jendrassik | May 27, 1941 |
| 2,292,288 | Pescara | Aug. 4, 1942 |
| 2,326,072 | Seippel | Aug. 3, 1943 |

FOREIGN PATENTS

| Number | Country | Date |
|---|---|---|
| 541,349 | Great Britain | Nov. 24, 1941 |